C. A. MENDENHALL.
RESILIENT WHEEL.
APPLICATION FILED APR. 10, 1917.
1,295,556.
Patented Feb. 25, 1919.
2 SHEETS—SHEET 1.
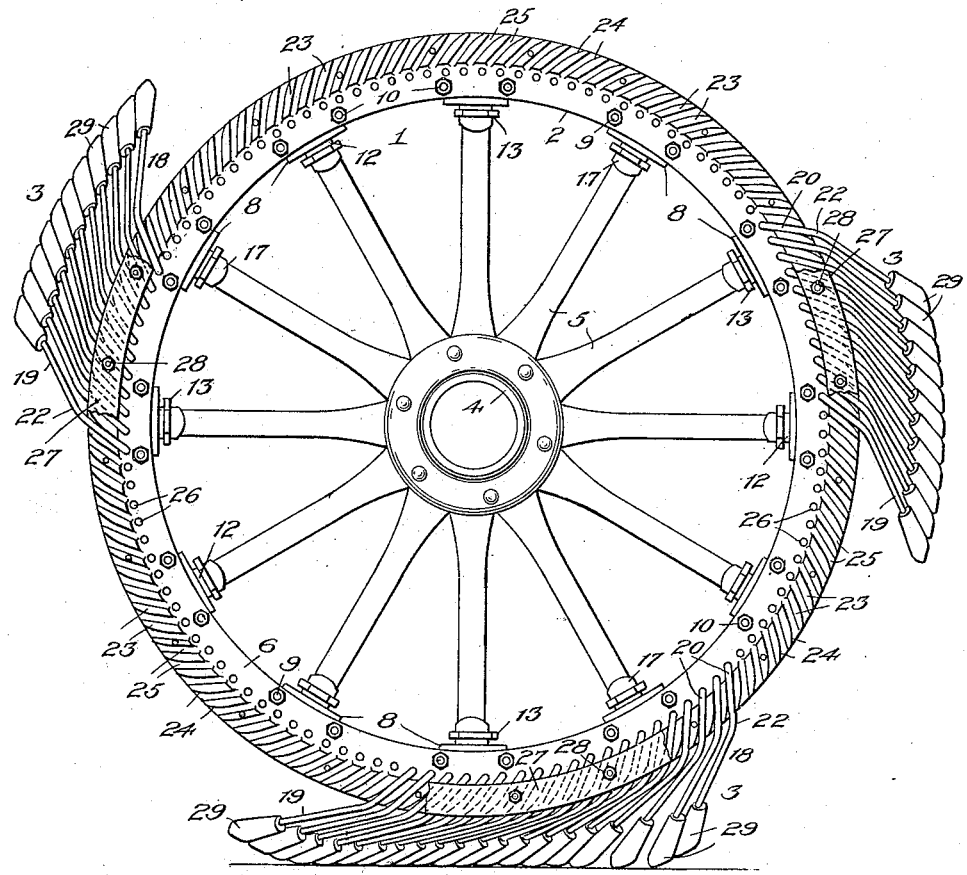
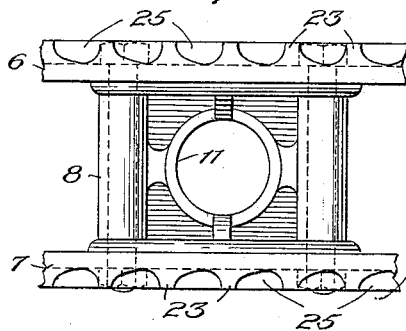
Witness
Edwin L. Bradford
Inventor
Chas. A. Mendenhall,
By Wm. O. Dye
Attorney C. A. MENDENHALL.
RESILIENT WHEEL.
APPLICATION FILED APR. 10, 1917.
1,295,556.
Patented Feb. 25, 1919.
2 SHEETS—SHEET 2.
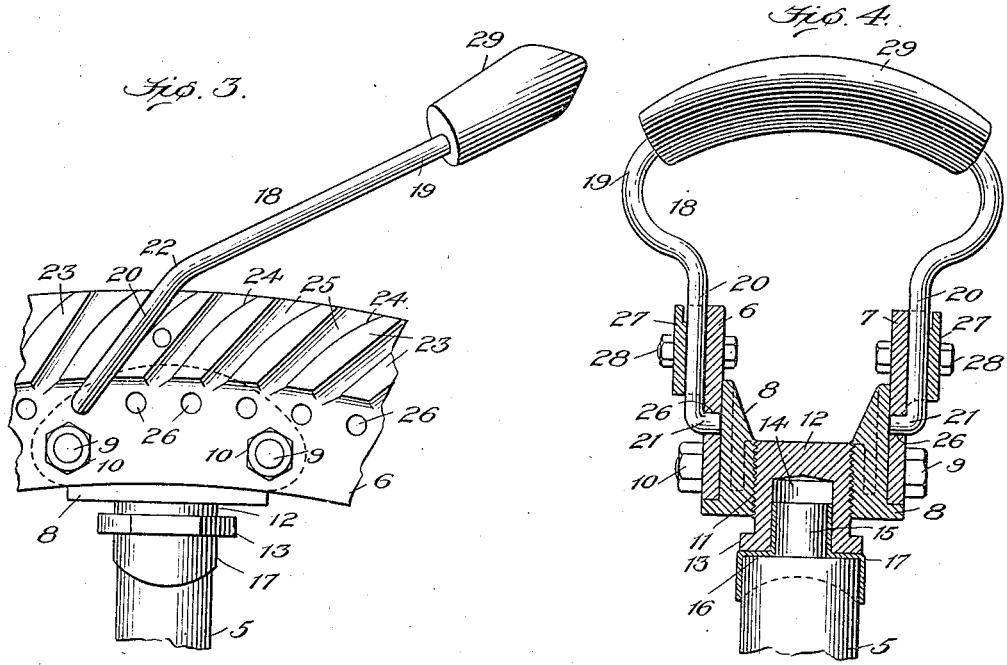
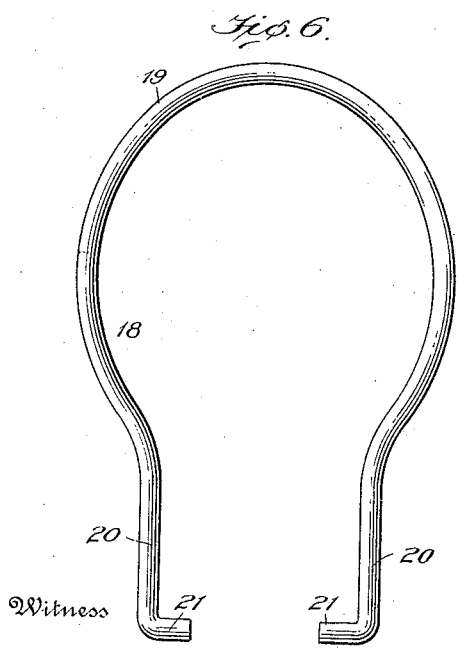
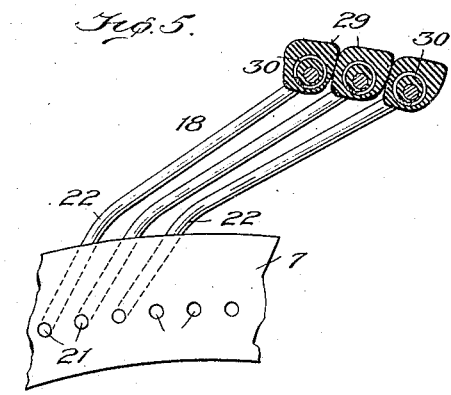

UNITED STATES PATENT OFFICE.

CHARLES A. MENDENHALL, OF FARMLAND, INDIANA.

RESILIENT WHEEL.

1,295,556.  Specification of Letters Patent.  Patented Feb. 25, 1919.

Application filed April 10, 1917. Serial No. 160,981.

*To all whom it may concern:*

Be it known that I, CHARLES A. MENDENHALL, a citizen of the United States, residing at Farmland, in the county of Randolph and State of Indiana, have invented certain new and useful Improvements in Resilient Wheels; and I do hereby declare the following to be a full, clear, and exact description of the invention, such as will enable others skilled in the art to which it appertains to make and use the same.

My invention relates to certain new and useful improvements in vehicle wheels, and contemplates more especially a novel form of retaining means for securing circumferentially arranged tread members, an embodiment of such tread members being illustrated in Letters Patent No. 1120,514, granted to me December 8, 1914.

An object of the present invention is the production of a wheel consisting of a series of closely and circumferentially arranged tread members yieldingly secured to a rim section, the latter being formed of spaced members provided with retaining grooves adapted to receive the free ends of the tread members.

Another object of my invention is to produce a wheel formed of a series of closely and circumferentially arranged spring tread members and means including spaced rim members provided with a series of angularly disposed retaining and fulcrum devices designed to receive the free ends of the tread members for more effectively equalizing the strain to which the said tread members are subjected and for increasing the longevity of the wheel at its maximum resilient efficiency.

A further object of this invention is to produce an improved vehicle wheel including among other things a series of circumferentially arranged tread members provided with tread sleeves designed to lay against each other throughout the greater circumferential distance of the wheel and to yieldingly separate immediately after leaving the ground over which the wheel has traveled.

With these and other objects in view the invention further consists in the combination and arrangement of the several parts of constructions hereafter to be described and claimed.

In the drawings, which show by way of illustration an embodiment of my invention, Figure 1 is a side elevation of my improved wheel showing the contacting position of the tread members for the greater distance around the wheel and the momentary spaced position thereof as they leave the ground over which the wheel has passed.

Fig. 2 is a detail plan view illustrating the retaining grooves in the spaced rim members.

Fig. 3 is a detail side elevation of a portion of the rim showing the manner in which one of the resilient tread members is retained and fulcrumed therein.

Fig. 4 is a transverse sectional view through the rim showing a tread member held in place.

Fig. 5 is a fragmentary view of several of the contacting tread members, the tread sleeve portions being shown in section, and Fig. 6 is a view of one of the tread members with the reinforcing tread sleeve removed.

The present invention has been designed to overcome the breakage now incident to the several tread members which go to make up the tire or tread surface of the wheel. It has been found in practice that the tendency of the tread members to break at or very near their fulcrum point is ever present unless a suitable supporting means is provided for the shorter arms of the tread members in close proximity to their fulcrums.

In the form of the tread member fulcrums shown in my application for Letters Patent Serial No. 106,047, filed June 26, 1916, the tendency has been for the tread member to shear at or very near the fulcrum point, and it is to overcome these difficulties that I have conceived the form of retaining and fulcruming means hereinafter to be described.

Referring to the drawings, the invention comprises a wheel 1 having a built-up rim section 2 to which are attached a series of resilient tread members 3 in tangential spring leverage relation, and means for attaching the said tread members.

The wheel 1 is formed with the usual hub 4 and radially extending spokes 5, to the outer ends of which is connected the rim section 2. The rim 2 comprises annular members 6 and 7 suitably spaced and connected by rim connectors 8 arranged at intervals about the rim at the outer ends of the spokes. The rim connectors are each formed with opposite parallel outer faces adapted to engage similar inner faces of the annular rim members 6 and 7. The rim connectors are interposed between the annular rim members and are provided with suitable openings designed to receive bolts 9 which pass through the said rim members. Suitable nuts 10 are provided on the ends of the said bolts and serve to securely clamp the annular rim members 6 and 7 in spaced relation. Each rim connector 8 is formed with a screw threaded central opening 11 into which is fitted a tenon cup or adjustable spoke receiving socket 12. A flange 13 is provided on the said spoke receiving socket 12, and a socket 14 is also formed therein.

The purpose of the socket 14 is to receive the tenon or reduced end portion 15 of the spoke. Fitted around the said tenon and the shoulder 16 formed thereby on the spoke, is a suitable cup-shaped guard 17 the purpose of which is to receive the thrust of the flange 13 and prevent all tendencies of the spoke to split, and insure a snug fit to the tenon 15 of the spoke in the socket 14.

In adjusting the spoke it will be seen that as the flange 13 is gripped and turned the said flange will bear against the shoulder 16 of the spoke, thereby firmly securing the spoke in position between the hub and the rim of the wheel. From this construction of the rim connector and spoke receiving socket it will be seen that a simple, efficient and readily assembled means is provided for building up the wheel, including the rim, in a minimum amount of time.

The tangentially arranged tread members 18 are secured to the annular rim members 6 and 7. These tread members are formed with an outer curved tread portion 19, and oppositely disposed parallel arms 20, the ends 21 of which are bent at right angles thereto, as clearly shown in Fig. 6 of the drawings. The parallel arms 20 are also bent at an angle as at 22, as shown in Figs. 1, 3 and 5 of the drawings.

The rim section and more especially the annular rim members 6 and 7 retain and fulcrum the tread members in a manner now to be described. The outer surfaces of the rim members are each provided with protruding lugs 23, angularly arranged with relation to the diameter of the said rims. These lugs are preferably formed integral with the rim members, but may be made separate and secured thereto. Near the upper end of each lug a portion thereof is tapered or rounded off as at 24, thereby enlarging the spaces or grooves 25 between the lugs, as shown. The edges opposite to those of the lugs, which are rounded off, are straight as shown and serve to aline one side of the parallel arms 20 within the spaces or grooves 25 when the free ends 21 are sprung into the openings 26 located at a point below the lugs in substantial alinement with the spaces or grooves 25. The spaces or grooves 25 formed between the lugs 23 may be of any suitable contour in cross section, depending upon the cross section of the material from which the tread members are constructed. This is preferably round, but it may be of other suitable forms. Suitable annular retaining rings 27 are secured to the rim members by bolts 28 and serve to hold the tread members in place.

In practice, the tread members 18 are positioned in the rim section by springing the right-angularly disposed free ends 21 of tread members into the openings 26, the parallel arms 20 of the tread members snugly fitting within the spaces or grooves 25 formed between the lugs 23 for at least one-half of the distance. The enlarged spaces formed at the periphery of the rim members by the rounding off of one side of the lugs 23 will permit of the yielding of the tread members and their fulcruming with portions of the arms 20 snugly fitting between the lower portions of the lugs 23. It will be seen that while the yielding of the tread members is in the nature of a lever, a considerable portion of the strain and load imparted through the said members will be received on the right angularly disposed and seated ends 21 thereof. In addition to the increased efficiency of the fulcrum point for the levers, it will be obvious that any tendency of the arms 20 to snap between the free ends 21 and the fulcrum point, will be prevented.

The material of which the tread members are composed is such that a substantial flex thereof on the fulcrum points can be obtained for a proper resiliency, when the load is applied as the tread members meet the ground, and also be subsequently returned to their normal position when the wheel is revolved and the tread members leave the ground. The effect of the separating of the tread members immediately following their leaving the ground over which the wheel has passed, is to dislodge any mud or the accumulation of substances which may adhere to the wheel.

As a result of the actions of the tread members in yieldingly fulcruming tangentially to the wheel, an increased resiliency and tractive action is obtained.

The form of reinforcing sleeve 29 secured to the outer portion 19 of each tread member is shown in section in Fig. 5 of the drawings, and comprises a material sufficiently resilient to permit of close contacting circumferentially around the wheel. The sleeves are positioned upon the outer portions 19 of the tread members in a position whereby the bulk of the material of the sleeve is arranged for contacting with the ground. A breaker strip 30 consisting of a coiled material or the like is preferably interposed within each tread sleeve as shown, and assists in the wear thereof. As shown, the cross sectional area of the reinforcing sleeves affords substantially an even outer tread surface for the wheel and at the same time permits of a close and substantial contacting of the said sleeves around the wheel.

From this construction it will be apparent that the load and tractive efficiency and action of the wheel is dependent upon the spring leverage action of the tread members, preferably retained and fulcrumed together with the especially designed reinforcing sleeves and their relative cross sectional location upon the curved portions of the tread members.

While I have shown a form of substantially rectangularly shaped reinforcing sleeves, it will be understood that various other cross sectional forms can be substituted, and I do not limit myself to the exact form shown herein. It will be further understood that while I have described and illustrated but one embodiment of my invention it will be understood that various changes in form, proportion and arrangement and construction may be resorted to without departing from the scope of my invention as set forth in the appended claims.

Having thus described my invention, what I claim and desire to secure by Letters Patent is:

1. A resilient wheel of the class described including in combination a tread surface composed of yieldingly arranged tread members each having an outer bearing surface and inwardly extending arms, and retaining means for said tread members, said means comprising a series of spaced lugs having one side each thereof tapered off and between which the inwardly extending arms of the tread members are yieldingly fulcrumed.

2. A resilient wheel comprising oppositely disposed annular rim members, each having a series of openings therein, a tread surface comprising tread members each having an outer bearing surface and inwardly extending arms the ends of which are secured in the aforesaid openings, and fulcrum means provided near the ends of the inwardly extending arms, said means comprising a series of tangentially slanting spaced lugs between which the inwardly extending arms of the tread members are yieldingly retained.

In testimony whereof I affix my signature, in presence of two subscribing witnesses.

CHARLES A. MENDENHALL.

Witnesses:
 CLIFF BALES,
 GEORGIA O. WEST.

Copies of this patent may be obtained for five cents each, by addressing the "Commissioner of Patents, Washington, D. C."